(12) United States Patent  
Nagamura et al.

(10) Patent No.: US 8,593,822 B2  
(45) Date of Patent: Nov. 26, 2013

(54) ELECTRONIC APPARATUS PROVIDED WITH A DETACHABLE ELECTRICAL COMPONENT

(75) Inventors: Yoshiaki Nagamura, Osaka (JP); Shintaro Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 13/237,553

(22) Filed: Sep. 20, 2011

(65) Prior Publication Data

US 2012/0069534 A1    Mar. 22, 2012

(30) Foreign Application Priority Data

Sep. 22, 2010  (JP) .................................. 2010-212512

(51) Int. Cl.  
*H05K 5/00* (2006.01)

(52) U.S. Cl.  
USPC ...... 361/752; 361/679.44; 361/801; 361/802; 361/803

(58) Field of Classification Search  
USPC ..................... 361/752, 679.44, 801, 802, 803  
See application file for complete search history.

(56) References Cited

U.S. PATENT DOCUMENTS

| 6,125,029 A | 9/2000 | Sasaki et al. |
| 2002/0126461 A1* | 9/2002 | Yazaki .......................... 361/752 |
| 2007/0197092 A1* | 8/2007 | Tanaka et al. ................ 439/607 |

FOREIGN PATENT DOCUMENTS

| JP | 10-268976 | 10/1998 |
| JP | 2003-076439 | 3/2003 |

* cited by examiner

*Primary Examiner* — Timothy Thompson  
*Assistant Examiner* — Andargie M Aychillhum  
(74) *Attorney, Agent, or Firm* — Hamre, Schumann, Mueller & Larson, P.C.

(57) ABSTRACT

The present invention improves the operability when opening and closing a cover. Since the cover is curved such that the front face is in a concave form, when opening a memory slot, part of the cover is lifted from a first casing by simply removing a screw from the first casing and the cover. The cover can be detached from the first casing by holding the lifted portion of the cover, and, thus, the memory slot can be opened easily without using the weight of the cover. Accordingly, it is possible to improve the operability when attaching a memory module to the memory slot or when detaching a memory module from the memory slot.

7 Claims, 6 Drawing Sheets

ELECTRONIC APPARATUS PROVIDED WITH A DETACHABLE ELECTRICAL COMPONENT

BACKGROUND OF THE INVENTION

1. Field of the Invention

The present application relates to an electronic apparatus provided with a slot to which an expansion module can be attached detachably.

2. Description of Related Art

Recent notebook computers are provided with a random access memory (RAM) that temporarily stores programs or data in order to execute various information processes at a central processing unit (CPU). As the size of a RAM increases, the size of an executable program or the number of simultaneously executable programs can be increased.

Typically, a RAM is formed by mounting a memory chip on a board in the form of a module. When this memory module is attached to a memory slot provided in a notebook computer, the memory size of the notebook computer can be increased. This memory slot typically is sealed with a cover in order to prevent a foreign particle from entering from the outside. The cover is typically in the shape of a plate. Patent Documents 1 and 2 disclose plate-shaped covers. The covers disclosed in Patent Documents 1 (JP 2003-076439A) and 2 (JP H10-268976A) are attached to an apparatus main body through claw coupling or screw threading.

However, in the case of a plate-shaped cover, when opening a memory slot in order to attach or detach a memory module, it is necessary to disconnect the claw coupling or screw threading, and then cause the cover to be detached by its own weight from an apparatus main body. More specifically, the electronic apparatus is initially positioned such that a face having the memory slot is oriented upward, claw coupling or screw threading is then disconnected, the electronic apparatus is then positioned such that the face having the memory slot is oriented downward, and the cover is detached by its own weight from the electronic apparatus. Subsequently, the memory module is attached or detached in a state where the face having the memory slot is oriented upward. Accordingly, when detaching a cover in order to attach or detach a memory module, it is necessary to change the posture of the electronic apparatus a plurality of times, which is very troublesome.

SUMMARY OF THE INVENTION

The present application disclosed herein is directed to an electronic apparatus provided with a component attachment portion to which an electrical component can be detachably attached, comprising: a casing that accommodates an electric circuit board; an opening portion that is formed near the component attachment portion of the casing; and a plate-shaped cover with which the opening portion can be opened and closed; wherein the cover is: provided with a deformation portion that can be deformed elastically in a thickness direction; and deformed into a shape that fits the opening portion.

According to the present application, it is possible to improve the operability when opening and closing the cover.

DESCRIPTION OF THE PREFERRED EMBODIMENT

Embodiment

1. Configuration of the Electronic Apparatus

Figure 1:
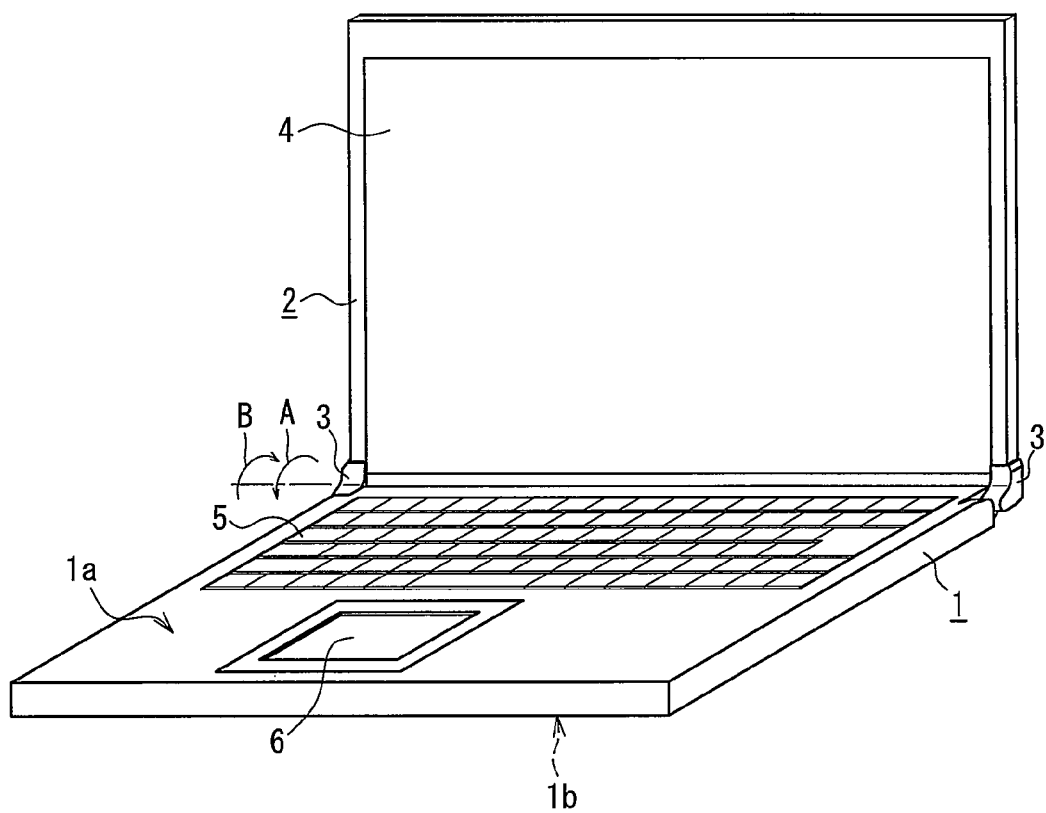
FIG. 1 is a perspective view of a notebook computer according to an embodiment.

FIG. 1 is a perspective view showing an external appearance of a notebook computer according to this embodiment.

As shown in FIG. 1, a notebook computer is provided with a first casing 1 and a second casing 2. The first casing 1 accommodates a circuit board on which various electric devices are mounted, a hard disk drive, and the like. The second casing 2 is provided with a liquid crystal display 4. The first casing 1 and the second casing 2 are supported so as to be tiltable about a hinge portion 3. The hinge portion 3 has a tilting shaft that supports the first casing 1 and the second casing 2 so as to be tiltable in the directions indicated by the arrows A and B. A keyboard 5 and a pointing device 6 are provided on an upper face 1a of the first casing 1. The lower face 1b of the first casing 1 is a face opposite the upper face 1a.

Figure 2:
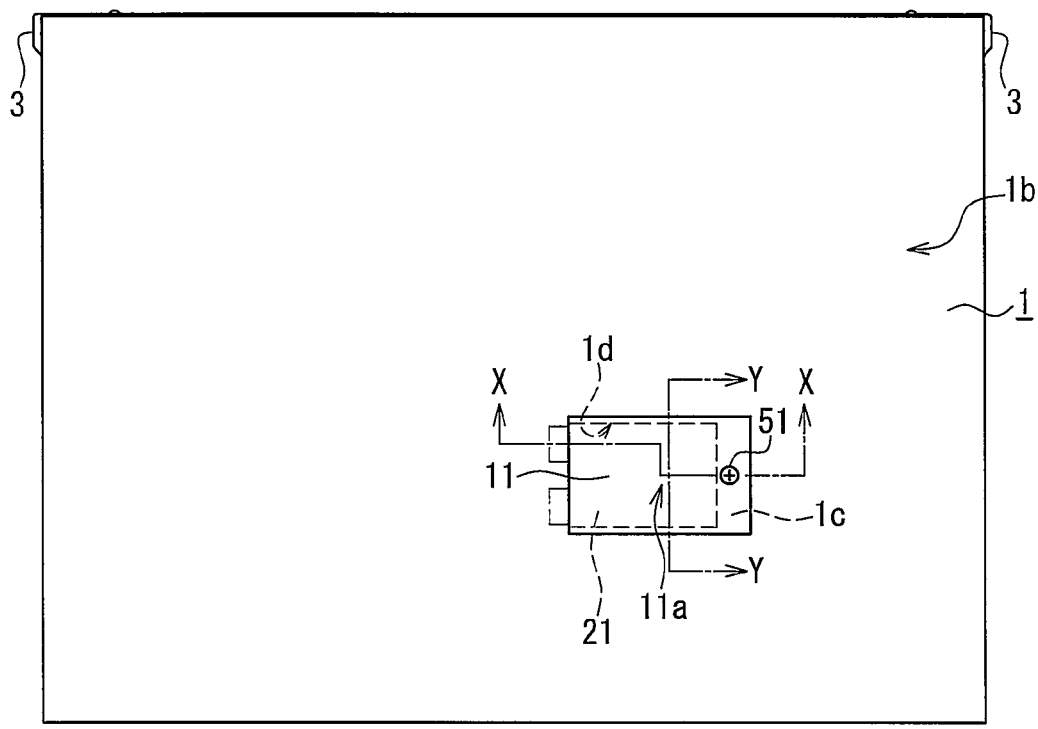
FIG. 2 is a plan view of a lower face of a first casing.

FIG. 2 is a plan view showing the configuration of the lower face 1b of the first casing 1. As shown in FIG. 2, the lower face 1b is provided with a memory slot 21 to which a memory module 41 (described later) can be attached. The memory slot 21 is blocked by a cover 11. The cover 11 can be attached detachably to the first casing 1. A flange portion 1c that supports the cover 11 is formed around an opening portion 1d of the memory slot 21, and, thus, the cover 11 is prevented from falling into the opening portion 1d. The cover 11 is attached to the first casing 1 through the threading of a screw 51.

Figure 3:
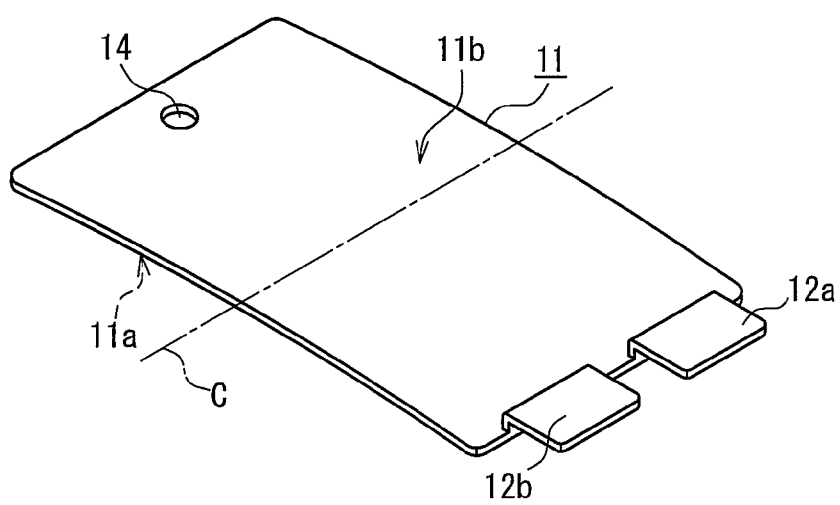
FIG. 3 is a perspective view of a cover.
Figure 4:
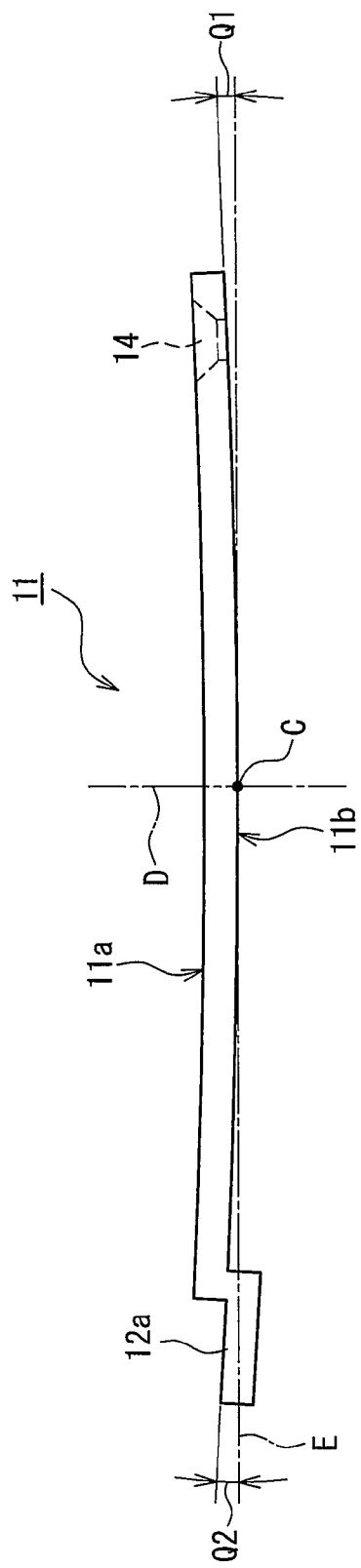
FIG. 4 is a side view of the cover.

FIG. 3 shows a perspective view of the cover 11 seen from the back face. FIG. 4 shows a side view of the cover 11.

The cover 11 is a substantially plate-shaped member that is large enough to block at least the memory slot 21. The cover 11 is made of a material that is elastically deformed in the thickness direction. The cover 11 is provided with ribs 12a and 12b at one end portion and a hole portion 14 at the other end portion.

The cover 11 has a deformation portion that can be deformed elastically in the thickness direction, and is curved or bent in the thickness direction without the application of an external force. When the cover 11 is attached to the back face 1b of the first casing 1 through the threading of the screw 51 in a state where the cover 11 blocks the memory slot 21 of the first casing 1, the deformation portion is deformed, so that the cover 11 has a shape that fits the opening portion 1d. When the cover 11 in this embodiment is placed as it is on the flange portion 1c so as to cover the opening portion 1d of the casing 1, that is, when no external force that, for example, causes the screw 51 to be threaded into the casing 1 is applied, the cover 11 has a shape in which a portion in the vicinity of the middle of a back face 11b of the cover 11 is lifted in a convex form. In other words, in a natural state where no external force is applied, the cover 11 in this embodiment is curved in the thickness direction about an axis C shown in FIG. 3 such that a portion in the vicinity of the middle of a front face 11a is lowered in a concave form. More specifically, as shown in FIG. 4, the cover 11 has a shape in which an angle Q2 at one end portion in the longitudinal direction equals to an angle Q1 at the other end portion. Here, a line segment E that defines the angles Q1 and Q2 is a tangent line that passes through the intersection of a line segment D, which passes through the center in the longitudinal direction of the cover 11, and the back face 11b. Here, the axis C and the line segment D perpendicularly intersect each other.

In this embodiment, the cover 11 is made of an elastic polybutyl terephthalate resin material, but any material may be used as long as it can be elastically deformed. Examples of the material include resin materials such as internally plasticized polyester, ester-ether copolymer, or nitrile-butadiene copolymer, and metals such as aluminum, stainless steel, or magnesium.

Here, the front face 11a of the cover 11 is a face that is oriented in the same direction as the lower face 1b of the first casing 1 in a state where the cover 11 is attached so as to block the memory slot 21 as shown in FIG. 2. The back face 11b is a face opposite the front face 11a.

The ribs 12a and 12b are formed integrally on the cover 11. The ribs 12a and 12b are formed on one side in the longitudinal direction in the back face 11b of the cover 11. The ribs 12a and 12b are formed so as to project from points inside the back face 11b in the planar direction of the back face 11b. In this embodiment, two ribs 12a and 12b are provided, but the number of ribs is not limited to two, and may be one, or three or more.

The hole portion 14 is formed on the other side in the longitudinal direction in the cover 11. The hole portion 14 has an inner diameter that allows at least a male screw portion of the screw 51 (see FIG. 2) to be inserted through the hole portion 14.

In this embodiment, a notebook computer has been shown as an exemplary electronic apparatus, but any apparatus may be used as long as it is provided at least with; a slot to which an expansion module can be detachably attached; and a cover with which the slot can be opened and closed. Furthermore, in this embodiment, a memory module has been shown as an exemplary expansion module, but this is merely an example, and application is possible also to a communication module and the like.

2. Operation That Attaches Memory Module

Figure 5:
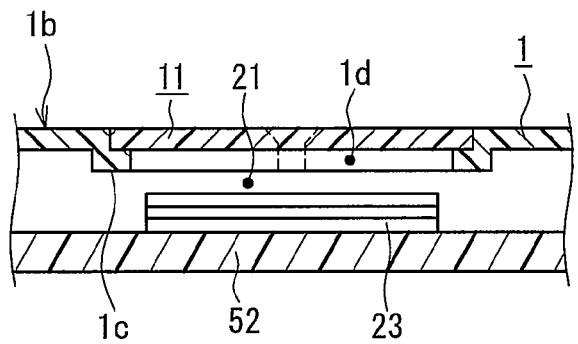
FIG. 5 is a cross-sectional view viewed in the Y-Y direction showing a state in which the cover has been attached to the first casing.

FIG. 5 is a cross-sectional view of a main portion showing a state in which the memory module 41 is not attached and the cover 11 blocks the memory slot 21. FIG. 5 shows a cross-sectional configuration viewed in the direction indicated by the arrows Y-Y in FIG. 2.

The cover 11 covers the opening portion 1d of the memory slot 21 in an openable and closable manner when both side face portions of the cover 11 are placed on the flange portion 1c formed on the casing 1.

FIGS. 6A to 6F are end views illustrating the procedure when attaching the memory module 41 to the memory slot 21, and show the configuration of a main portion viewed in the direction indicated by the arrows X-X in FIG. 2.

Figure 6A:
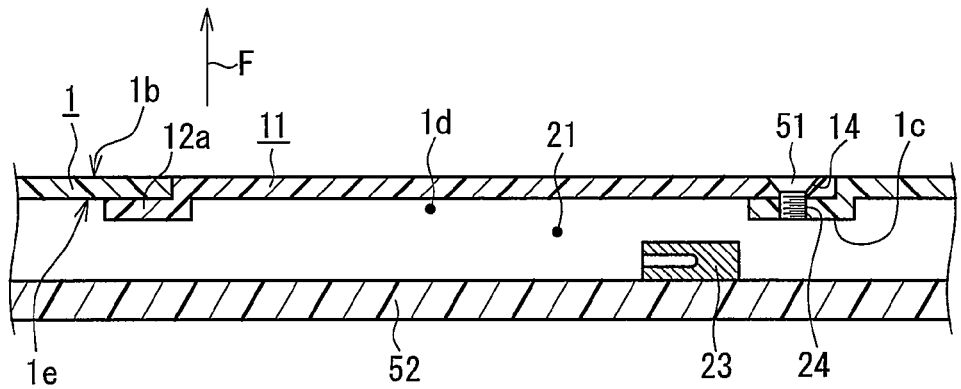
FIG. 6A is an end view showing a state in which the cover has been attached to the first casing.

FIG. 6A shows a state in which the memory module 41 is not attached and the cover 11 blocks the memory slot 21. That is to say, FIG. 6A shows the same state as that shown in FIG. 5.

In this state, the ribs 12a and 12b (only the rib 12a is shown in FIGS. 6A to 6F) are in contact with an inner face 1e of the first casing 1, that is, a face on the inner side of the lower face 1b near one end portion of the cover 11, and the screw 51 is threaded via the hole portion 14 into a screw hole 24 that is formed through the flange portion 1c near the other end portion. Thus, a state in which the memory slot 21 is blocked can be maintained. Here, the cover 11 is curved as shown in FIG. 4 when not blocking the memory slot 21, but is deformed into a substantially flat shape as shown in FIG. 6A when blocking the memory slot 21. Accordingly, in the state shown in FIG. 6A, a force that returns the cover 11 to its original curved shape acts, and the ribs 12a and 12b are pressed from the inside against the inner face 1e. As a result, a force in the direction indicated by the arrow F in FIG. 6A acts on the ribs 12a and 12b. Accordingly, the cover 11 is closed in a state where backlash hardly occurs with respect to the first casing 1.

Figure 6B:
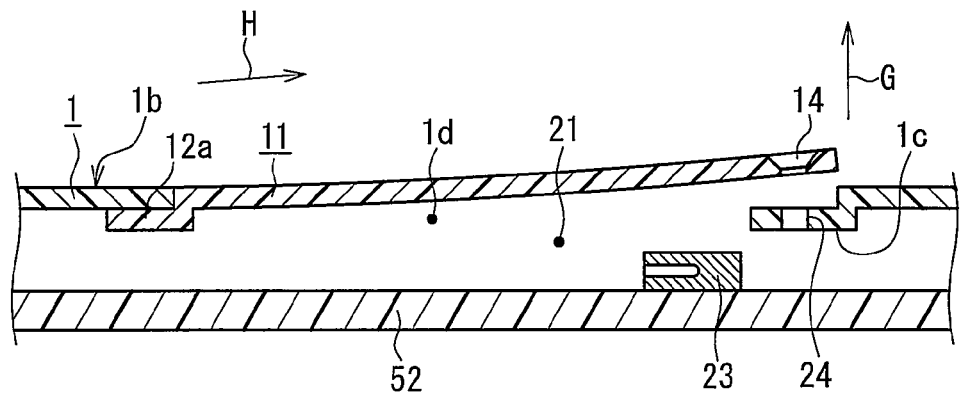
FIG. 6B is an end view showing a state in which a screw has been removed.

When detaching the cover 11 to open the memory slot 21, as shown in FIG. 6B, the screw 51 is removed from the screw hole 24 and the hole portion 14. When the screw 51 has been removed from the screw hole 24, since a force that returns the cover 11 to its original shape acts and the cover 11 is placed on the flange portion 1c, the cover 11 does not fall into the opening portion 1d, and the other end portion having the hole portion 14 is displaced in the direction indicated by the arrow G. Accordingly, the other end portion of the cover 11 is lifted from the back face 1b of the first casing 1.

Figure 6C:
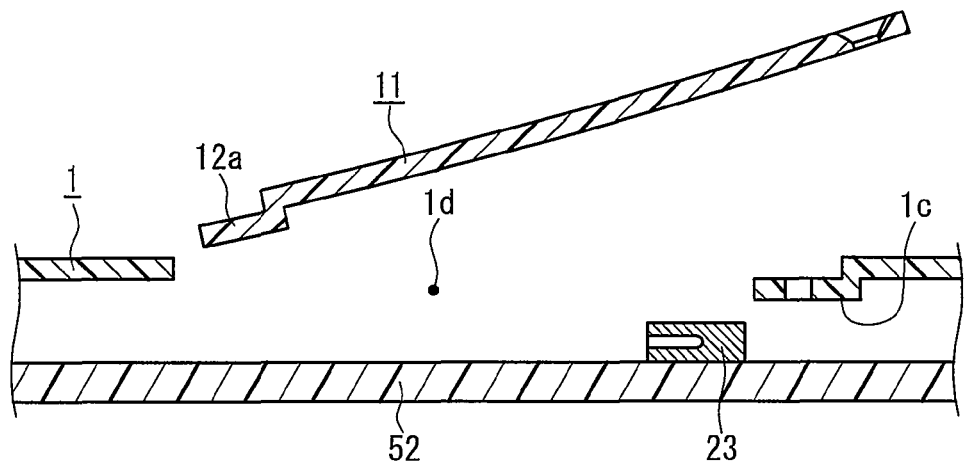
FIG. 6C is an end view showing a state in which the cover has been detached from the first casing.

Next, the lifted other end portion of the cover 11 is held, and the cover 11 is displaced in the direction indicated by the arrow H. Accordingly, as shown in FIG. 6C, the rib 12a (as well as the rib 12b) can be detached from the first casing 1, and the cover 11 can be detached from the first casing 1.

Figure 6D:
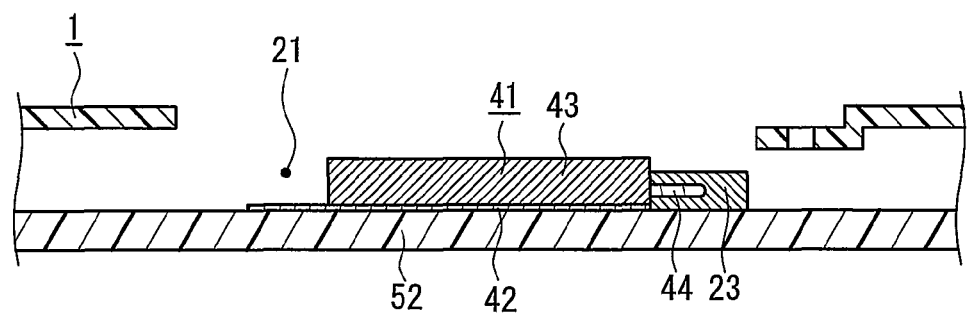
FIG. 6D is an end view showing a state in which a memory module has been attached to a memory slot.

Next, as shown in FIG. 6D, the memory module 41 is attached to a predetermined position in the memory slot 21. The memory module 41 is formed by mounting a memory chip 43 having an electric contact point 44 onto a board 42. Specifically, the memory module 41 is attached by inserting the electric contact point 44 into an opening portion of the connector 23 mounted on an electric circuit board 52. Accordingly, a contact disposed inside the connector 23 and the electric contact point 44 are electrically connected to each other. Furthermore, when the electric contact point 44 is inserted into the opening portion of the connector 23, the memory module 41 is mechanically held by the connector 23.

Figure 6E:
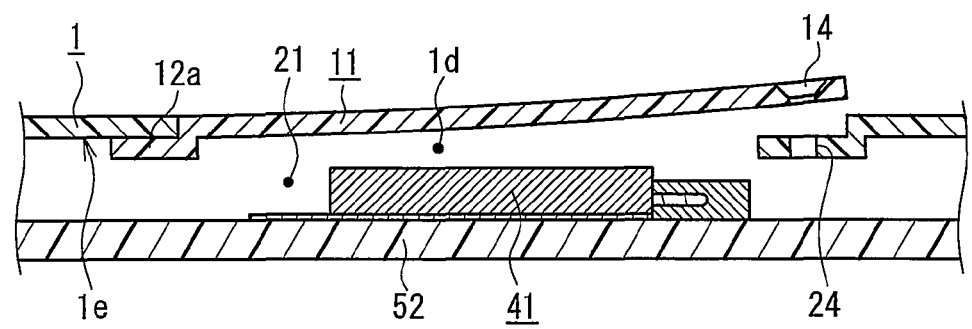
FIG. 6E is an end view showing a state in which ribs of the cover have been engaged with the first casing.

Next, as shown in FIG. 6E, the rib 12a (as well as the rib 12b) of the cover 11 is inserted into the memory slot 21 and brought into contact with the inner face 1e of the first casing 1. At that time, since the cover 11 is curved, the other end portion having the hole portion 14 is lifted from the first casing 1.

Figure 6F:
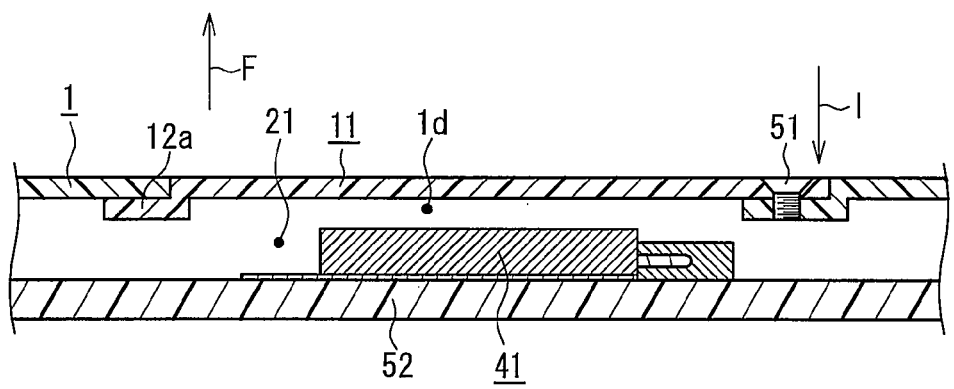
FIG. 6F is an end view showing a state in which the cover has been attached to the first casing through the threading of the screw.

Next, as shown in FIG. 6F, while applying a force in the direction indicated by the arrow I in FIG. 6F, which is a direction in which the other end portion of the cover 11 is pressed against the casing 1, the screw 51 is inserted through the hole portion 14 and threaded into the screw hole 24. At that time, as the screw 51 is threaded into the screw hole 24, the cover 11 is elastically deformed from a curved shape into a flat shape, and the other end portion is secured to the casing 1. As shown in FIG. 6F, the screw 51 is threaded into the screw hole 24 until the back face 11b of the cover 11 is brought into contact with the flange portion 1c of the first casing 1. Accordingly, the cover 11 is attached to the first casing 1 through the threading of the screw 51. Here, in the state shown in FIG. 6F, a force that returns the cover 11 to its original curved shape acts, and the ribs 12a and 12b are pressed against the inner face 1e, and a force in the direction indicated by the arrow F acts as in the state of FIG. 6A. Accordingly, the cover 11 is attached in a state where backlash hardly occurs with respect to the first casing 1.

With the above-described procedure, the memory module 41 can be attached to the memory slot 21. Here, when detaching the memory module 41 that has been attached to the memory slot 21, the cover 11 is detached from the first casing 1 following the procedure shown in FIGS. 6A to 6C, the memory module 41 is detached from the connector 23, and the first casing 1 is closed with the cover 11 following the procedure shown in FIGS. 6E and 6F.

3. Effects Etc. of the Embodiment

According to this embodiment, the cover 11 is curved such that the front face 11a is in a concave form, and, thus, when opening the memory slot 21, part of the cover 11 is lifted from the first casing 1 by simply removing the screw 51 from the first casing 1 and the cover 11. Since the cover 11 easily can be detached from the first casing 1 by holding the lifted portion of the cover 11, the memory slot 21 can be opened without an operation that turns the notebook computer upside down and causes the cover 11 to be detached from the opening portion 1d by its own weight. Accordingly, it is possible to improve the operability when attaching the memory module 41 to the memory slot 21 or when detaching the memory module 41 from the memory slot 21.

Here, also in the case where the cover is curved such that the front face is in a convex form, if the screw has been removed from the first casing and the cover in order to open the memory slot, the middle portion of the cover is deformed so as to be lifted upward, and, thus, the cover can be easily detached by holding the middle portion of the cover. Note that, in the case where the cover is curved such that the upper face is in a convex form, the lifted portion of the cover is smaller than in the case where the cover is curved such that the upper face is in a concave form.

Furthermore, a force that lifts the middle portion of the cover upward always acts when the opening portion is closed, and, thus, a gap may tend to be formed between the cover and the flange portion. Accordingly, it is natural that, in the case where the cover is required to repel water and dust, the upper face of the cover is curved more preferably in a concave form as described in this embodiment.

Furthermore, according to this embodiment, the cover 11 is curved such that the front face 11a is in a concave form, and, thus, when the cover 11 is attached to the first casing 1 as shown in FIG. 6A or 6F, a force that returns the cover 11 to its original shape acts, and the ribs 12a and 12b are pressed against the inner face 1e of the first casing 1. Accordingly, backlash hardly occurs in the cover 11 that has been attached to the first casing 1, and the cover 11 is positioned stably on the first casing 1.

Furthermore, according to this embodiment, the cover 11 is curved such that the front face 11a is in a concave form, and, thus, the heat dissipation efficiency of the memory module 41 is expected to be higher than in the case where the cover is curved such that the front face 11a is in a convex form. For example, in the case where the cover is curved such that the front face is in a convex form, even if the cover is deformed into a substantially flat shape when blocking the memory slot as shown in FIG. 6F and the like, heat generated by the memory module may deform the cover into a convex form, that is, so as to bulge outward from the first casing. If the cover is deformed into a convex form, space between the cover and the memory module increases, heat generated by the memory module is less likely to be transferred to the cover 11, and the heat dissipation efficiency of the memory module becomes poor. On the other hand, if the front face 11a of the cover 11 is deformed into a concave form, even when heat of the memory module 41 deforms the cover 11, the cover 11 is deformed in a direction that reduces space between the cover 11 and the memory module 41, and, thus, heat generated by the memory module 41 can be transferred efficiently to the cover 11. Accordingly, it is natural that, also in order to improve the heat dissipation effect of the memory module, the front face 11a of the cover 11 is curved more preferably in a concave form. In this embodiment, the cover 11 is made of a resin material, but if the cover 11 is made of a material having excellent thermal conductivity such as a metal, the heat dissipation efficiency of the memory module 41 can be improved further.

In this embodiment, an example has been described in which the cover 11 blocks the memory slot 21, but the cover 11 can be applied to other various configurations capable of blocking the opening portion 1d formed in the casing 1. For example, this embodiment can be applied to a cover that blocks a slot to which an expansion module such as a communication module can be attached detachably, a cover that blocks a slot that can accommodate a battery, a cover that blocks a slot that can accommodate a hard disk drive, a cover that blocks various terminals, and the like.

Furthermore, in this embodiment, one end portion of the cover 11 is attached to the first casing 1 through the threading of the screw 51, and the other end portion of the cover 11 is engaged at the ribs 12a and 12b, but a configuration is also possible in which screws are threaded into both end portions of the cover 11.

Furthermore, in this embodiment, the cover 11 is made of an insulating resin material, but it may be made of an electrically conductive material or may have a surface plated with an electrically conductive material. If the cover 11 is electrically conductive and the first casing 1 is made of an electrically conductive material such as a metal, when the first casing 1 is closed with the cover 11 as shown in FIG. 6A or 6F, electrical conductivity can be obtained between the cover 11 and the first casing 1 by causing the inner face 1e and the ribs 12a and 12b to be closely engaged with each other and the hole portion 14 and the screw hole 24 to be attached to each other through the threading of the screw 51. Accordingly, it is possible to reduce EMI in the notebook computer based on unwanted electromagnetic waves radiated from the memory module 41 connected to the connector 23.

Furthermore, in this embodiment, the cover 11 is curved substantially throughout the entirety in the longitudinal direction, but may be shaped such that at least one of its both ends in the longitudinal direction is curved. Furthermore, the cover 11 may be shaped such that its middle portion in the longitudinal direction is bent. Furthermore, the cover 11 may be curved in a direction perpendicular to the longitudinal direction.

Figure 7:
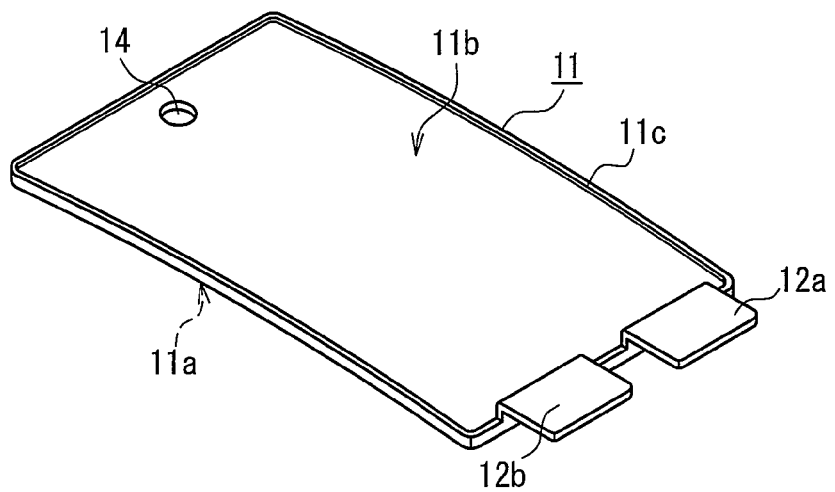
FIG. 7 is a perspective view showing a modified example of the cover.

Furthermore, the cover 11 is preferably provided with a configuration for maintaining its curved shape. FIG. 7 is a perspective view of a cover provided with a rib for maintaining the curved shape. The cover 11 in the modified example shown in FIG. 7 has an upright rib 11c near the edge portion of the back face 11b. Accordingly, the rigidity of the cover 11 is improved, and the desired curved shape effectively can be prevented from being changed into a shape close to a flat shape over time. Here, the cover 11 shown in FIG. 7 has the rib 11c substantially throughout the entire edge portion of the back face 11b, but the rigidity of the cover 11 can be improved by forming the rib 11c at least near a pair of mutually opposed longer sides of the edge portion of the back face 11b.

In the description above, the first casing 1 in this embodiment is an exemplary casing. The cover 11 in this embodiment is an exemplary cover. The memory slot 21 or the connector 23 in this embodiment is an exemplary component attachment portion. Furthermore, the memory module 41 in this embodiment is an exemplary electrical component. Furthermore, the electric circuit board 52 in this embodiment is an exemplary electric circuit board. The ribs 12a and 12b in this embodiment are exemplary engagement portions. The hole portion 14 in this embodiment is an exemplary interlock portion. The rib 11c in this embodiment is an exemplary wall portion.

Furthermore, in the foregoing embodiment, a notebook computer has been described as an exemplary electronic apparatus, but the electronic apparatus is not limited to a notebook computer and may be various personal computers such as desktop personal computers or so-called tablet personal computers. In particular, a cover that is deformed automatically in a direction so as to be easily held when the threading into a casing is disconnected, can be applied preferably to an electronic apparatus such as a desktop personal computer in which the casing is large and heavy and thus changing its direction is difficult. Furthermore, the electronic apparatus of this embodiment is not limited to a personal computer, and can be realized as various electronic apparatuses in which the casing is provided with an opening portion that can be closed, such as portable apparatuses (e.g., personal digital assistants (PDA), portable game devices, personal medical apparatuses, personal television sets, personal Blu-ray disc players, DVD players, etc.) and stationary electronic apparatuses.

The present application is useful for electronic apparatuses in which an opening portion of the casing can be blocked by a cover.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic apparatus provided with a component attachment portion to which an electrical component can be detachably attached, comprising:
    a casing that accommodates an electric circuit board;
    a component attachment portion on the circuit board, to which an electrical component can be detachably attached;
    an opening portion formed in the casing to permit access to the component attachment portion, the casing defining a peripheral wall of the opening; and
    cover with which the opening portion can be opened and closed, the cover being secured to the casing to close the opening portion and being plate-shaped;
    wherein the cover:
        can be elastically deformed in a thickness direction; and fit the opening portion to close the opening portion;
        the cover has a first surface that faces the interior of the casing when the opening portion is closed with the cover, the first surface defining a convex shape due to restoration of the cover from the elastic deformation when the cover is released from the casing; and
        the cover has a first end with an upper surface that contacts a lower surface of the peripheral wall and a second end with a lower surface that contacts an upper surface of the peripheral wall when the opening portion is closed, with the second end of the cover being secured to the casing.

2. The electronic apparatus according to claim 1, wherein a second surface of the cover, opposite to the first surface, has an electrically conductive material.

3. The electronic apparatus according to claim 1, wherein an outer peripheral portion of the cover is provided with a wall portion that projects from the first surface.

4. The electronic apparatus according to claim 1, wherein the cover has a first curvature in a released state, and the cover has a second curvature smaller than the first curvature when the second end of the cover is secured to the casing so that the opening portion is closed by the cover.

5. The electronic apparatus according to claim 4, wherein the first curvature is larger than a curvature of the outer surface of the casing near the opening portion, and the second curvature of the cover the cover is closer to the curvature of the outer surface of the housing than is the first curvature.

6. The electronic apparatus according to claim 1, wherein the cover is completely detached from the casing when the opening portion is opened.

7. The electronic apparatus according claim 1, further comprising a removable engagement member for securing the second end of the cover to the casing.

* * * * *